US008342791B2

(12) United States Patent
Van De Klundert

(10) Patent No.: US 8,342,791 B2
(45) Date of Patent: *Jan. 1, 2013

(54) DEPALLETIZING DEVICE

(75) Inventor: Mark Van De Klundert, Raamsdonksveer (NL)

(73) Assignee: CSi Industries B.V., Raamsdonksveer (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/190,124

(22) Filed: Jul. 25, 2011

(65) Prior Publication Data

US 2012/0034060 A1    Feb. 9, 2012

Related U.S. Application Data

(63) Continuation of application No. 11/884,598, filed as application No. PCT/NL2006/000041 on Jan. 25, 2006, now Pat. No. 8,007,224.

(30) Foreign Application Priority Data

Feb. 18, 2005    (NL) ..................................... 1028344

(51) Int. Cl.
*B65G 57/11*    (2006.01)
*B65G 59/02*    (2006.01)
(52) U.S. Cl. .................................. 414/795.9; 414/797.3
(58) Field of Classification Search .................. 198/321, 198/497, 510.1; 271/81; 414/351, 353, 398, 414/488, 507, 574; 901/9

See application file for complete search history.

(56) References Cited

U.S. PATENT DOCUMENTS 1,464,513 A    8/1923    Sutherland, Jr.
3,070,241 A    12/1962    Johnston
(Continued)

FOREIGN PATENT DOCUMENTS

JP    06171762    6/1994
(Continued)

*Primary Examiner* — Gregory Adams
(74) *Attorney, Agent, or Firm* — Kilpatrick Townsend & Stockton LLP

(57) ABSTRACT

The invention relates to a depalletizing device comprising a carriage as well as a friction roller attached to the carriage, which friction roller is rotatable about a horizontal rotation axis and is coupled to a rotational drive in order to rotate. The carriage can be moved to and fro in a direction at right angles to the rotation axis of the friction roller in order to push the friction roller against a side of an object on the pallet in such a manner that the friction roller exerts an upward friction force on the object as a result of which the object is raised on that side, and in order for the friction roller to pass underneath said object after the latter has been raised. The depalletizing device comprises drive means with variable driving power in order to drive the carriage. The drive means comprise detection means. The drive means are designed such that, when the carriage moves, it is driven with a power of not more than a base value and that, when the friction roller engages on the side of the object, the driving power is increased from that power until the detection means detect that the object has been raised. The power is then immediately reduced to the power of not more than the said base value when the detection means detect that the object has been raised sufficiently high.

22 Claims, 11 Drawing Sheets

U.S. PATENT DOCUMENTS

| | | |
|---|---|---|
| 3,749,257 A | 7/1973 | Yamashita |
| 3,799,057 A | 3/1974 | Cassel |
| 4,281,955 A | 8/1981 | McWilliams |
| 4,453,874 A | 6/1984 | Veldhuizen et al. |
| 4,766,322 A | 8/1988 | Hashimoto |
| 5,238,350 A | 8/1993 | Krieg et al. |
| 5,265,712 A | 11/1993 | Krieg |
| 6,746,203 B2 * | 6/2004 | Leblanc et al. ............ 414/796.9 |
| 8,007,224 B2 * | 8/2011 | Van De Klundert ....... 414/795.9 |
| 2003/0137273 A1 | 7/2003 | Davidov |
| 2004/0261485 A1 | 12/2004 | Peruzzo et al. |

FOREIGN PATENT DOCUMENTS

| | | |
|---|---|---|
| JP | 08012084 A | 1/1996 |

* cited by examiner

DEPALLETIZING DEVICE

CROSS-REFERENCES TO RELATED APPLICATIONS

This application is a continuation application of U.S. application Ser. No. 11/884,598, filed Apr. 24, 2008, which is a U.S. National Phase of International Application No. PCT/NL2006/000041, filed Jan. 25, 2006, and which claims priority to Netherlands Patent App. No. 1028344, filed Feb. 18, 2005. The disclosures of the above applications are incorporated herein by reference.

BACKGROUND OF THE INVENTION

The invention relates to a depalletizing device for lifting up objects loaded onto a pallet. More in particular, the invention relates to a depalletizing device comprising a carriage as well as a friction roller attached to the carriage, which friction roller is rotatable about a horizontal rotation axis and is coupled to a rotational drive in order to rotate, the carriage being movable to and fro in a direction at right angles to the rotation axis of the friction roller in order to push the friction roller against a side of an object on the pallet in such a manner that the friction roller exerts an upward friction force on the object, as a result of which the object is raised on that side, and in order for the friction roller to pass underneath said object after the latter has been raised.

GB 1 559 973 discloses a depalletizing device having a sliding carriage and a roller which is arranged at the front thereof so as to be rotatable. The roller is arranged in a spring-mounted manner relative to the carriage by means of a coiled spring. The roller is driven in rotation. During depalletizing, the carriage is moved in the direction of the objects on a pallet. When the roller touches an object on the pallet, the spring is pushed in, resulting in an increase in the spring force and thus the pressing force of the roller on the object. As a consequence of this increasing pressing force, the friction between the moving roller surface and the object increases until the roller moves the object upwards and causes it to tilt. One side of the object is lifted up by the roller and once the object has tilted sufficiently, the roller will pass underneath the object, the object being moved backwards via the roller.

BRIEF SUMMARY OF THE INVENTION

It is an object of the invention to provide an improved depalletizing device.

This object is achieved according to the invention by a depalletizing device comprising a carriage as well as a friction roller attached to the carriage. The friction roller is rotatable about a horizontal rotation axis and is coupled to a rotational drive in order to rotate. The carriage is movable to and fro in a direction at right angles to the rotation axis of the friction roller in order to push the friction roller against a side of an object on the pallet in such a manner that the friction roller exerts an upward friction force on the object, as a result of which the object is raised on that side, and in order for the friction roller to pass underneath said object after the latter has been raised. The depalletizing device comprises drive means with variable driving power in order to drive the carriage. The drive means comprise detection means, and are designed such that, when the carriage moves, it is driven with a power of not more than a base value. Furthermore the drive means are designed such that, when the friction roller engages on the side of the object, the driving power is increased from that power until the detection means detect that the object has been raised, and such that the power is immediately reduced to the base power when the detection means detect that the object has been raised sufficiently high.

As the carriage is driven with low power, the roller is applied to the object to be depalletized at a low speed. The device according to the invention is suitable for depalletizing objects of varying dimensions and weight. The power is automatically increased if this is required in order to raise the respective object, thus ensuring that the roller is applied to the object with a force which is as low as possible. The latter is advantageous in order to prevent the object from being damaged or crushed.

In one preferred embodiment, the carriage is driven by an electrically driven frequency motor or servomotor. Using these types of motors, the power can be quickly adjusted. Thus, when an object has been raised, the power can be reduced very quickly, so that the carriage does not slip, which could lead to damage to the object or to the palletized objects situated behind it.

Preferably, the drive means comprise a control unit coupled to the detection means in order to control the power. The control unit may be designed in a simple manner for increasing or decreasing the motor power, based on information from the detection means. The increase in power may be effected in a step by step or continuously variable manner.

In another preferred embodiment, the detection means comprise a light source and an optical sensor connected to the control unit which are arranged opposite one another in such a manner that a light beam is transmitted from the light source to the sensor at the front, parallel to the friction roller, the control unit preferably being designed to increase the power of the motor for as long as a certain proportion of the light beam is interrupted by the object to be raised and to decrease the power when the light beam is no longer interrupted.

The invention will be explained in more detail with reference to the drawings.

DETAILED DESCRIPTION OF THE INVENTION

Figure 1:
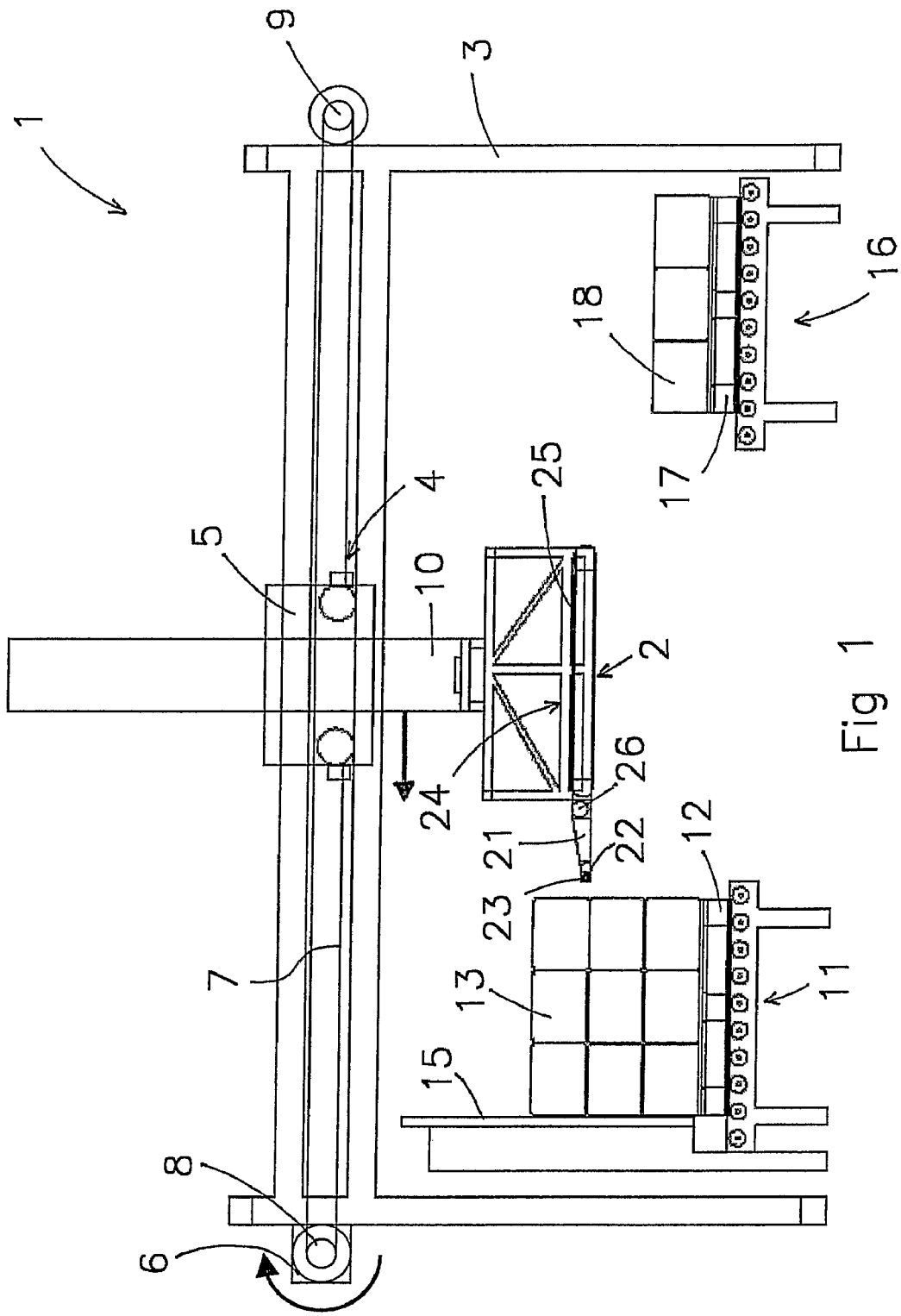
FIG. 1 shows an embodiment of a depalletizing device according to the invention.

FIG. 1 shows a depalletizing device 1. The depalletizing device 1 comprises a carriage 2 and a preferably gantry-shaped stationary frame 3. The carriage 2 is coupled to a travelling crab 5 which is displaceable in a horizontal direction over a guide 4 attached to the frame 3 by means of a motor 6, arranged on the frame 3. The travelling crab 5 is coupled to the motor 6 by means of a chain 7 or another suitable transmission element. The chain 7 is guided over a chain wheel 8 driven by the motor 6 and over a freely rotatable chain wheel 9 which is located on the other side of the frame 3. A transmission, for example a gear reduction, may be arranged between the chain wheel 8 and the motor 6. The chain 7 is fixedly connected to the travelling crab 5 so that the latter is moved along the guide 4 by rotation of the chain wheel 7 of the motor 6.

The carriage 2 is vertically displaceable relative to the travelling crab 5 and thus relative to the stationary frame 3 by means of lifting means. The lifting means comprise a lifting member 10 which is shown diagrammatically by way of example, is substantially rigidly connected to the carriage 2 and can be displaced in a vertical direction relative to the travelling crab 5 by means of a lifting drive (not shown).

A stationing location 11 is situated under the frame 3 for a pallet 12 containing stacked objects 13 to be depalletized. The stationing location 11 is preferably formed by a part of a roller conveyor, as illustrated in FIG. 1. A retaining panel 15 is arranged on one side of the stationing location 11, which retaining panel supports the objects 13 on the pallet 12 on one side and retains them during depalletizing, as will be explained in more detail in the description below.

On the other side, under the frame 3, a second stationing location 16 for pallets 17 is provided. This second stationing location 16 may serve for the stationing of pallets 17 which have to be filled with objects 18. In an alternative embodiment, this could be a stationing location for objects 13 to be depalletized, as is the case for 11. In the latter case, a retaining panel could then preferably be arranged and the carriage 2 would have to be rotatable through 180° relative to the lifting member 10.

A protruding part 21 which runs obliquely upwards is provided on a front of the carriage 2. A friction roller 22 is fitted to the front of the oblique part 21. The friction roller 22 is preferably rigidly connected to the carriage 2.

Figure 2:
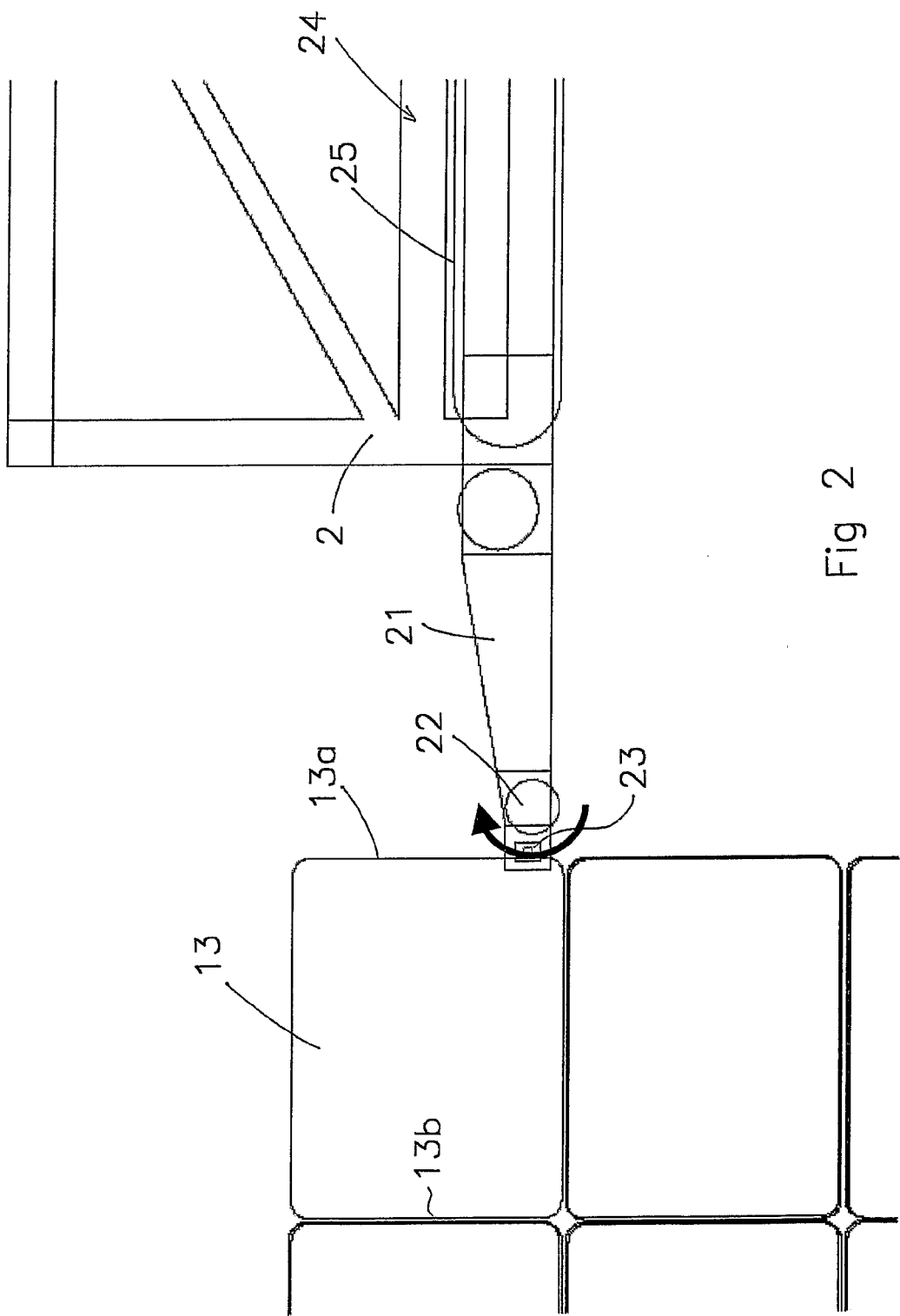
FIGS. 2 to 6 show a detail view of a front part of a carriage of a depalletizing device according to the invention in various stages during the raising of a palletized object.

The friction roller 22 is rotatable about a horizontal rotation axis. The friction roller 22 preferably extends over the entire width of the carriage 2. The roller 22 is coupled to a rotational drive 27, which preferably causes the roller 22 to rotate continuously at a constant speed, in a direction as is indicated in FIG. 2 by a curved arrow, the direction of rotation being such that the front of the roller 22 exerts an upwardly directed friction force on an object 13, as is illustrated in FIG. 2 by a curved arrow, when the roller 22 engages on the object 13.

Detection means are provided near the friction roller 22. These detection means are preferably optical detection means 23, for example comprising a light source and a sensor. FIG. 2 shows a sensor 23a which is arranged near a first end of the friction roller 22. Near the other end of the friction roller 22, a light source is arranged which is not shown in the figure. The light source emits a beam of light along the front of the friction roller 22, parallel to the centre axis thereof. When the light beam is interrupted by an object 13 situated in front of the friction roller 22, the sensor 23a will generate a corresponding signal.

Behind the friction roller 22, a stationing platform 24 is provided on the carriage 2 for receiving objects 13 which have been lifted up.

Preferably, the stationing platform 24 on the carriage 2 is provided with conveying means, such as a conveyor belt 25 and/or one or more driven rollers 26 in order to transport the lifted object 13 away from the friction roller 2 on the carriage towards the rear. Obviously, it is also possible to use other conveying means rather than those shown here.

The part 21 which runs obliquely upwards may itself also be provided with a conveyor belt.

The motor 6 for driving the carriage is preferably an electrically driven servomotor or frequency motor. The maximum power supply of such a motor can be varied.

Figure 10:
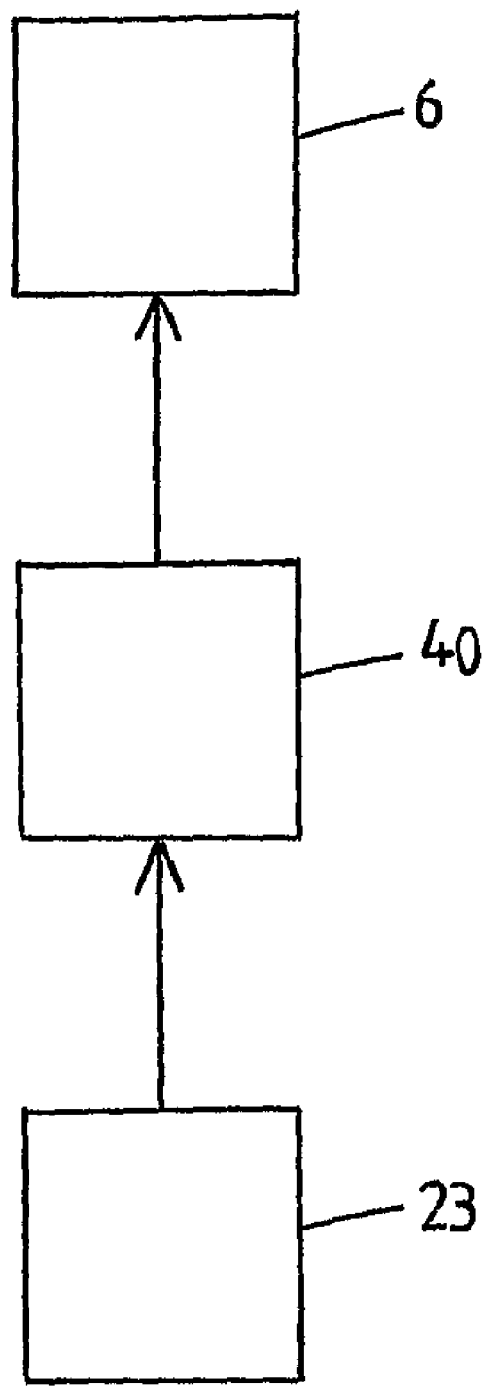
FIG. 10 shows a schematic representation of a control system for the depalletizing device of FIG. 1.

The depalletizing device 1 preferably comprises a control unit 40 which is coupled to the motor 6 and the detection means 23 as is shown in FIG. 10. The operation of the device 1 will be explained in more detail with reference to FIGS. 2-6.

In order to remove the objects 13 stacked onto a pallet 12 from the stack, the carriage 2 is moved in the direction of the stacked objects by means of the control unit 40 and the motor 6. The height of the carriage 2 is in this case preferably set, for example by the control means, such that the friction roller 22 is at the level of the bottom half of the object 13, preferably as close as possible to the bottom edge of the side 13a on which the roller 22 engages (see FIG. 2). Said height setting can be determined for example with the aid of optical means coupled to the control unit 40. It is also possible, in case the height coordinates of the objects to be depalletized are known beforehand, to preprogram these into the control unit 40.

The control means 40 control the motor 6 such that it supplies a power of not more than a base value, as a result of which the carriage 2 provided with the roller 22 approaches the object 13 at a predetermined, preferably low and preferably constant, speed when it is in the vicinity thereof.

Figure 3:
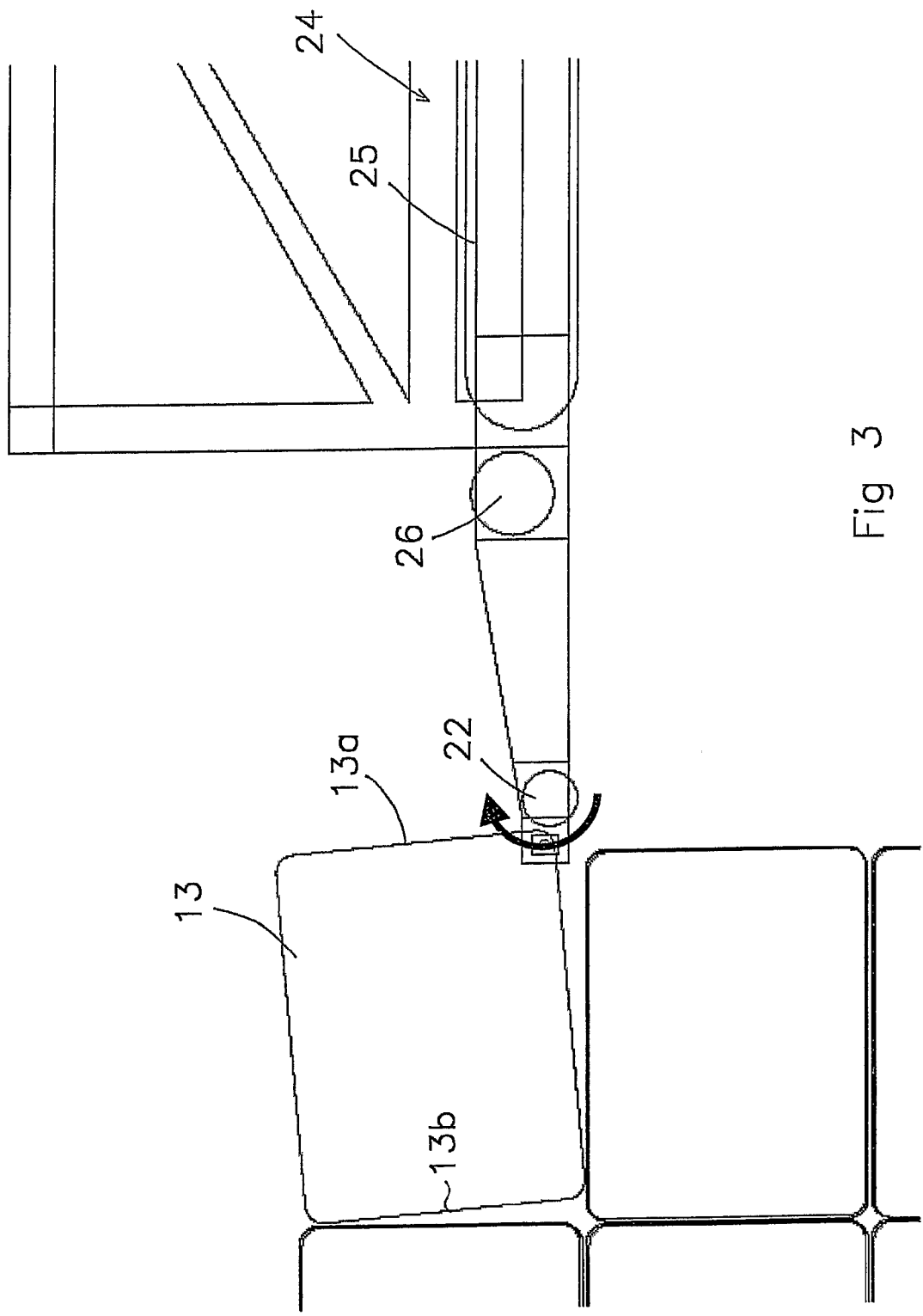

When the object 13 to be lifted touches the roller 22 and the sensor 23a is shielded to a sufficient degree from the light beam emanating from the opposite light source, the sensor 23a will emit a signal to the control unit 40. On the basis of that signal, the control unit 40 will then drive the motor 6 to a higher driving power. As a result of this higher driving power, the roller 22 is pressed against the side 13a of the object 13 with greater force. The object 13 is retained at its opposite side 13b by an adjacent object 13 or by the retaining panel 15. An increase in pressing force results in an increase in the friction force between the roller 22 and the side 13a, which will eventually lead to the side 13a being lifted up, as shown in FIG. 3. As long as the sensor 23a is covered by the object 13, the control unit will continue to increase the power supplied by the motor 6. This increase in power may be effected in a step by step but also in a continuously variable manner. Preferably, the power is increased quickly in this case, so that the pressing force and thus the friction force between the roller 22 and the object 13 rise quickly.

Figure 4:
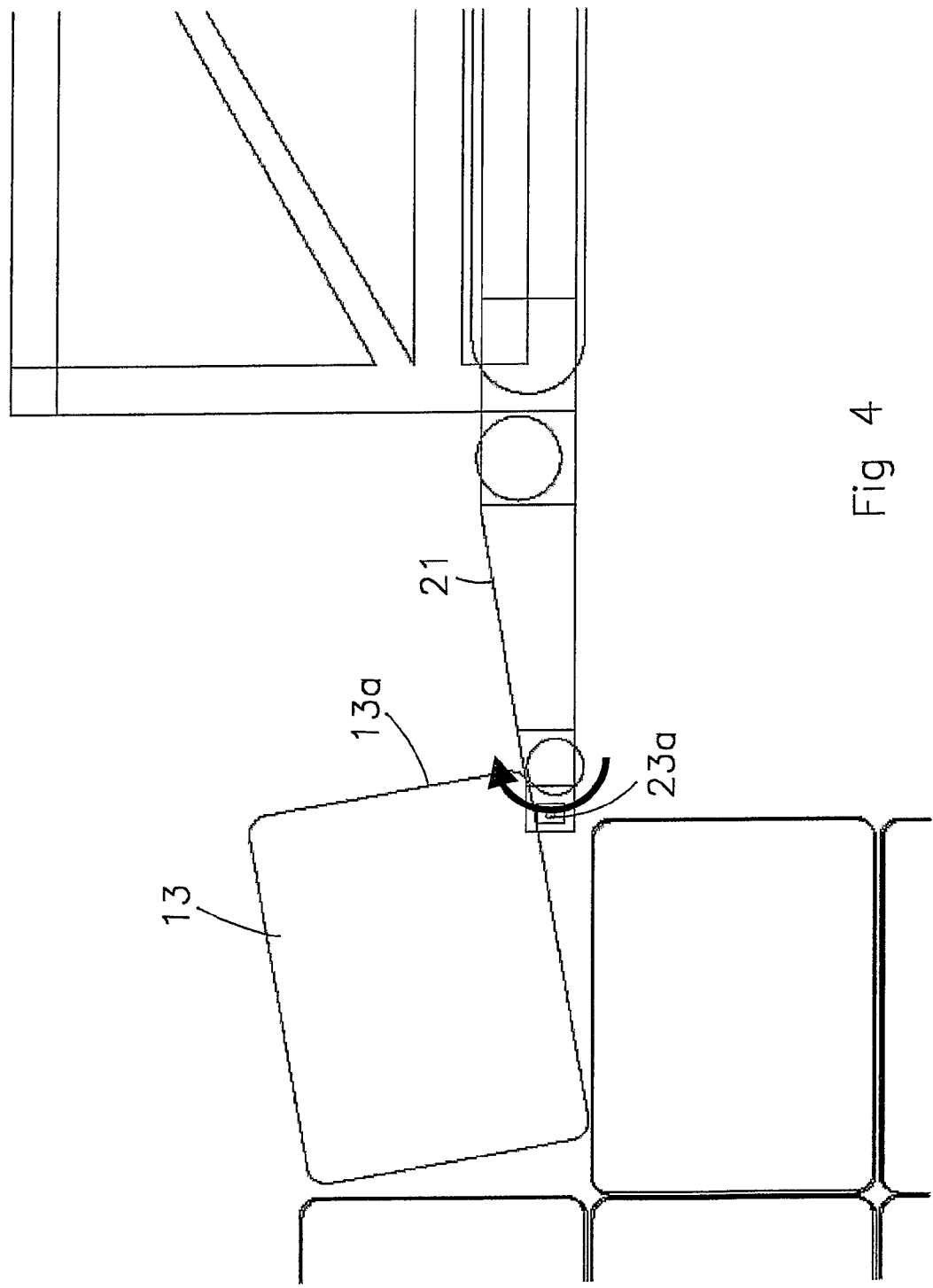
Figure 5:
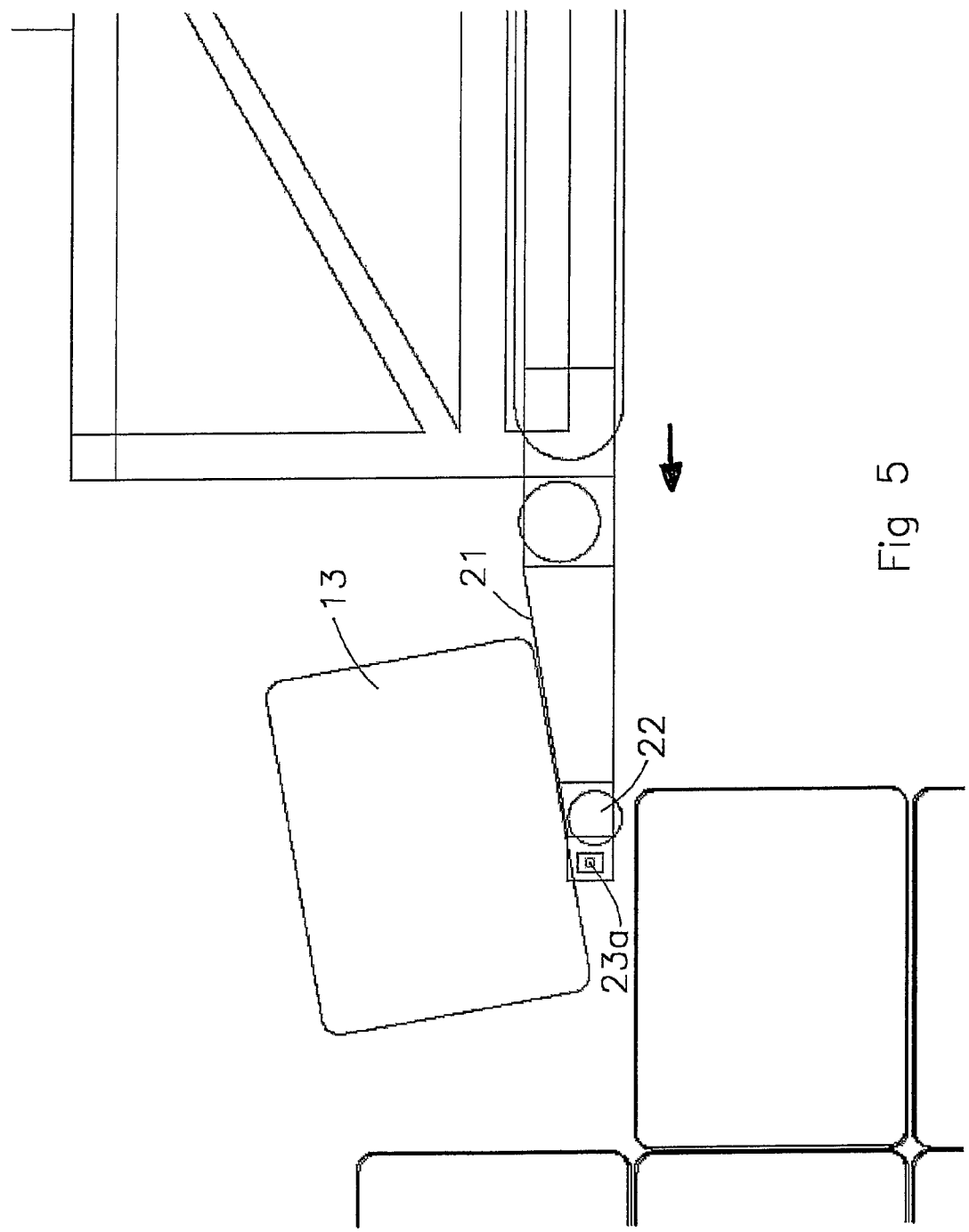
Figure 6:
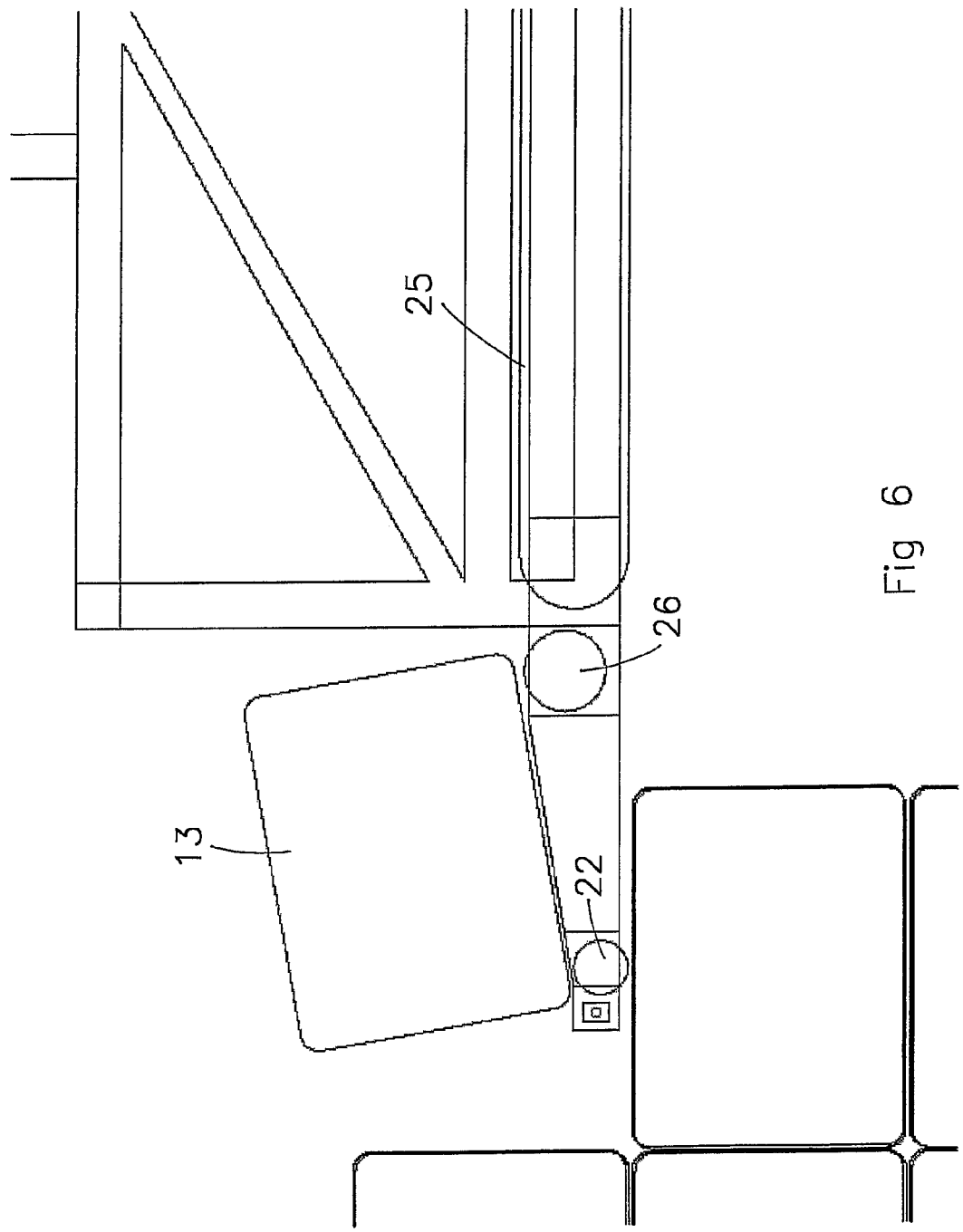
Figure 7:
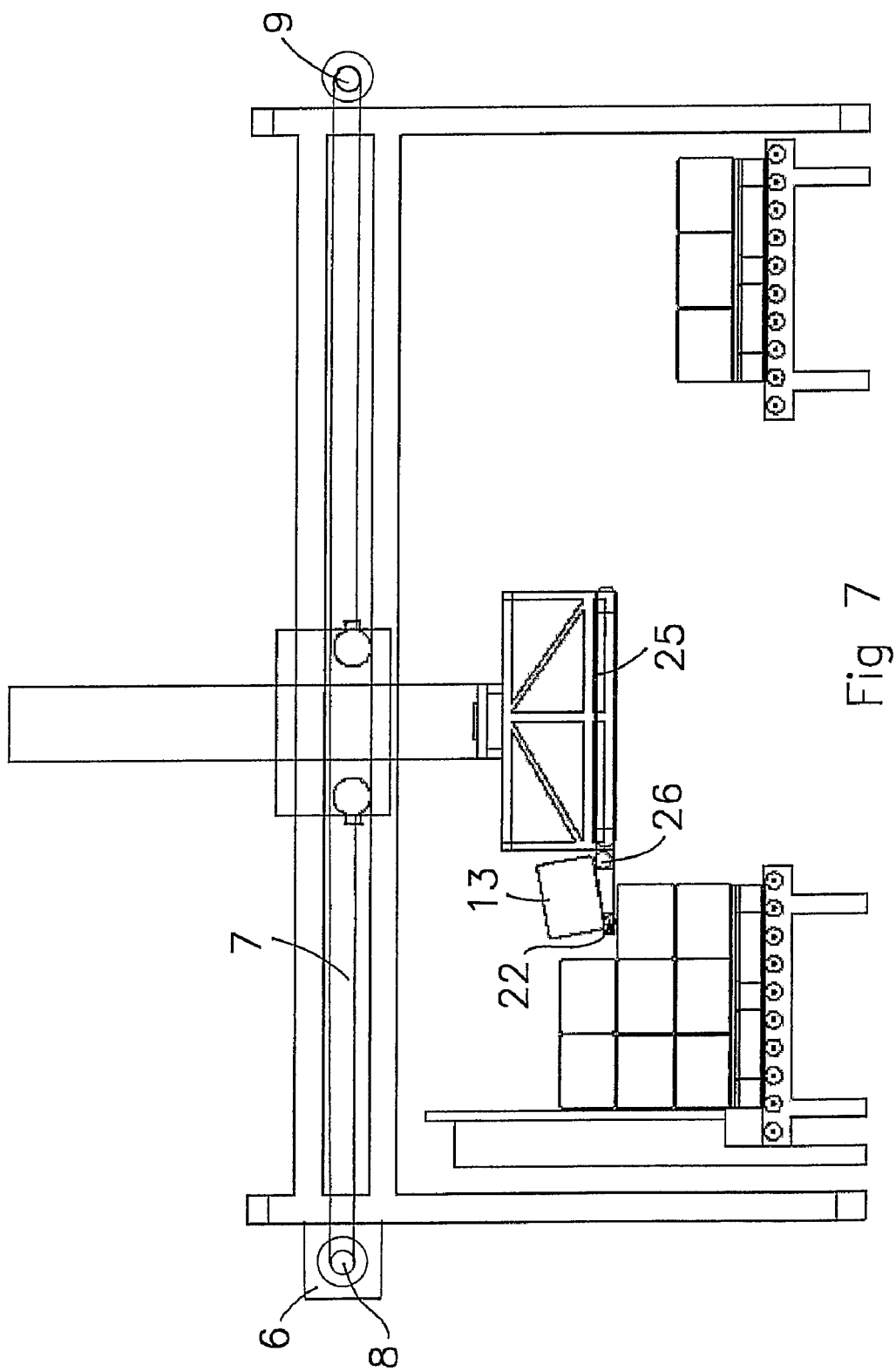
FIG. 7 shows the depalletizing device from FIG. 1 in the state corresponding to FIG. 6.
Figure 8:
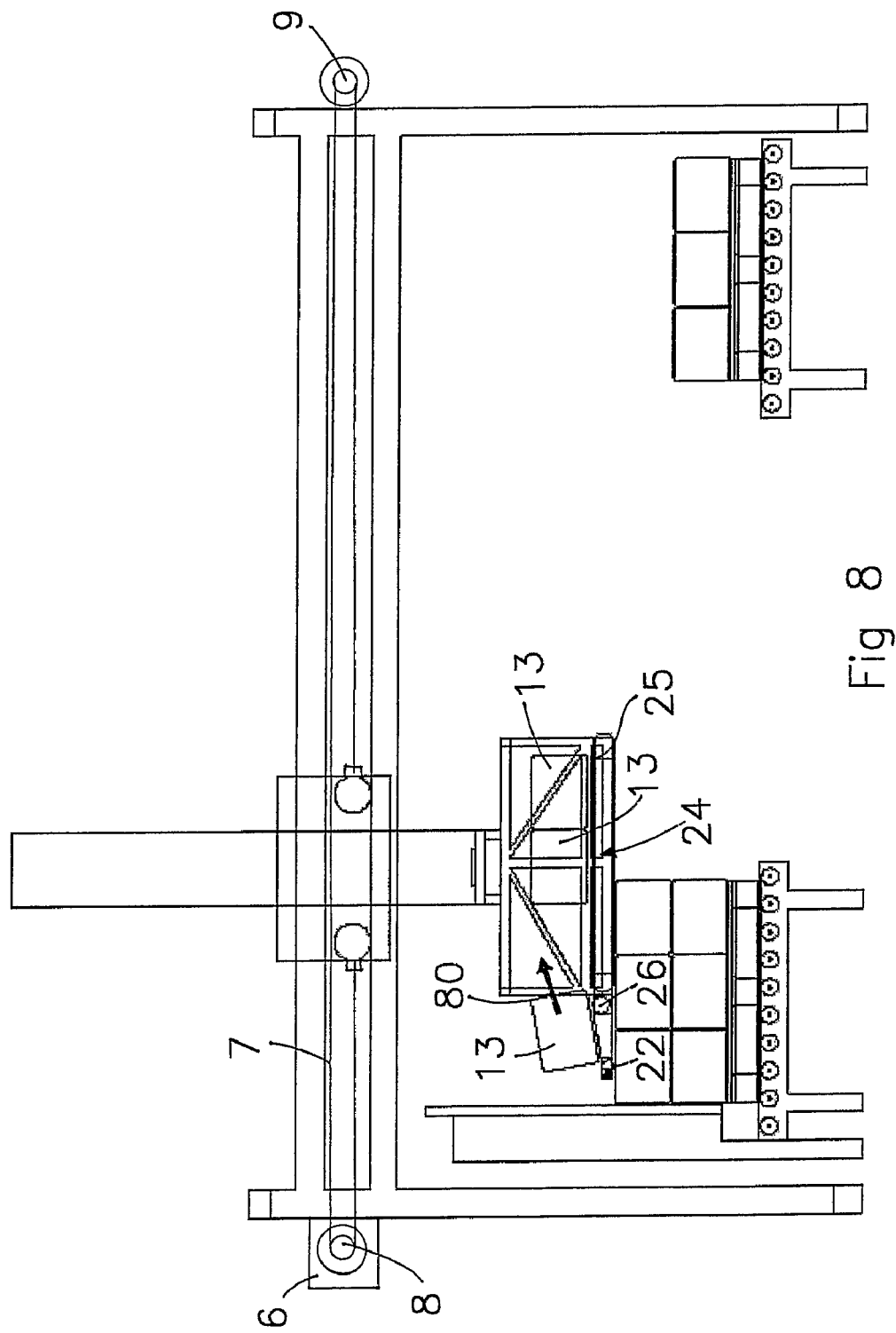
FIG. 8 shows the depalletizing device from FIG. 1 with several objects on the carriage.

When the side 13a of the object 13 has been lifted by the effect of the friction force to such an extent that the object 13 no longer blocks the sensor 23a and the light beam can thus reach the sensor 23a, as indicated in FIG. 4, the sensor 23a will emit a signal to the control unit 40. Based on this signal, the control unit 40 will immediately decrease the power of the motor 6 to no more than the aforementioned base value. The oblique part 21 will then pass under the raised object 13 at a low speed, as is illustrated in FIG. 5. When virtually the entire object 13 has been transported over the roller 22 (see FIG. 6 and FIG. 7), the object 13 is transported further to the rear over the roller 26 and by means of the conveyor belt 25, which is indicated by an arrow 80 in FIG. 8, in which two rows of objects 13 have already been arranged on the platform 24 by way of example.

Figure 9:
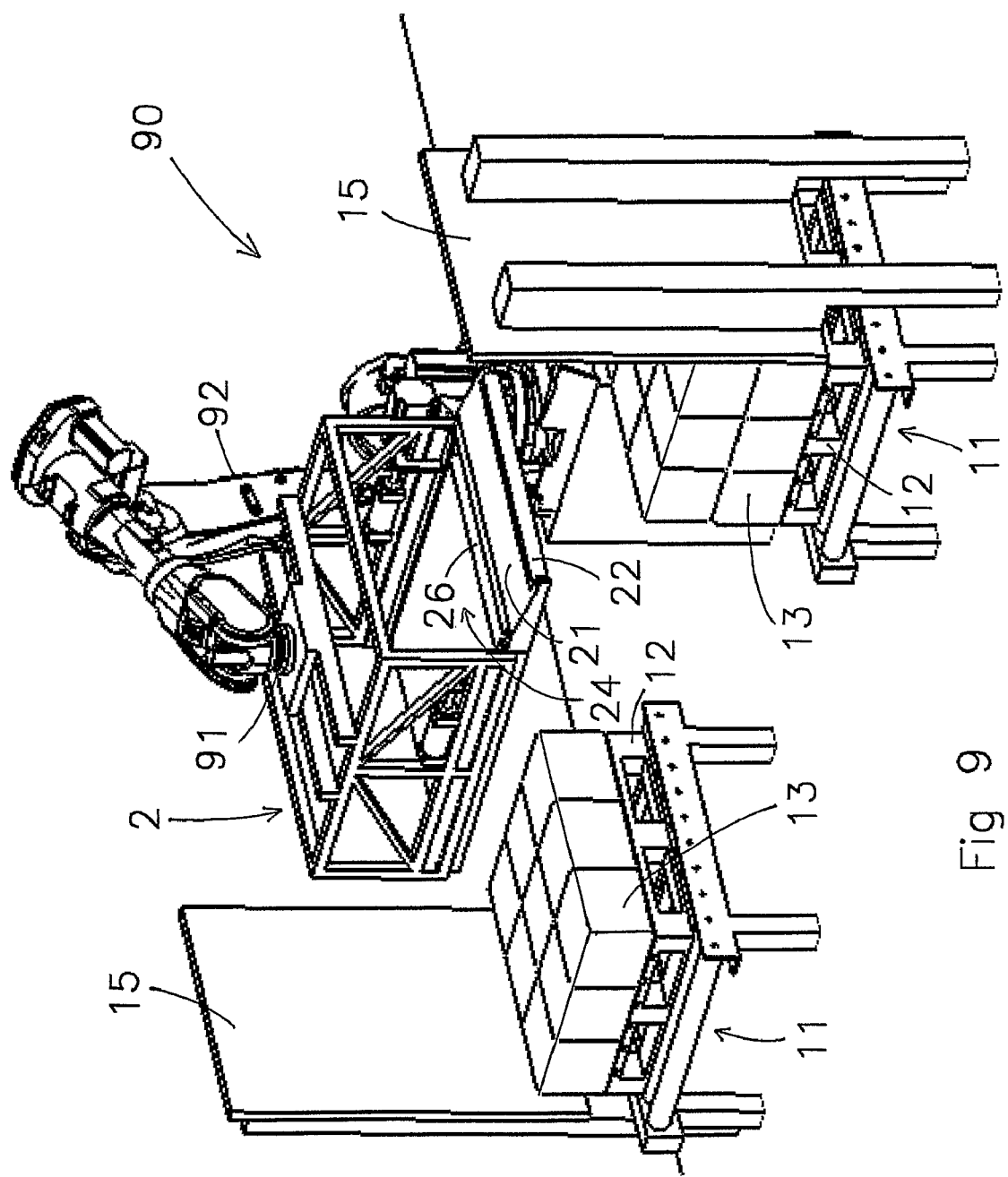
FIG. 9 shows another embodiment of a depalletizing device according to the invention.

FIG. 9 shows an alternative depalletizing device 90 according to the invention. With this depalletizing device 90, the carriage 2 is arranged on the head 91 of a spherical robot 92. The parts of the carriage 2 are essentially identical to those described with reference to the FIGS. 1-8. These parts as well as those of the stationing locations for the pallets 12 are denoted by the same reference numerals in FIG. 9. Reference is made to the above for a description of the relevant parts.

Figure 11:
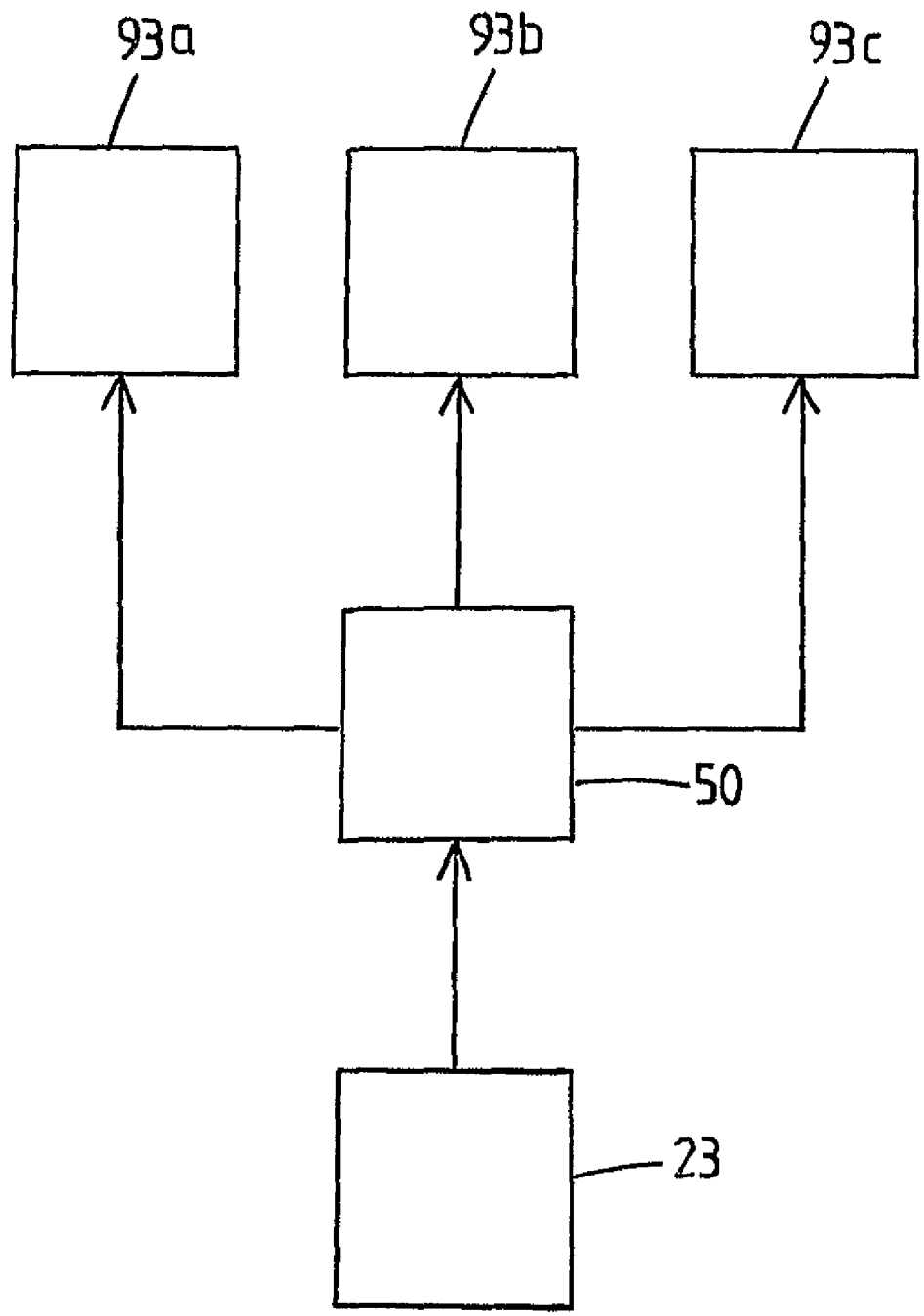
FIG. 11 shows a schematic representation of a control system for the depalletizing device of FIG. 9.

The spherical robot 92 is coupled to a control unit 50 having servo controls for the actuators 93 of the robot 92 (cf. FIG. 11). These servo controls make up the power control which was described above with reference to the FIGS. 1-8. In this embodiment, the drive means of the carriage 2 comprise the robot 92 and the associated control unit 50.

It should be understood that in addition to the two embodiments shown in the figures it is possible, without departing from the scope of the invention, to use any suitable drive by which the functionality as described in the claims can be achieved.

The depalletizing device 1, 90 according to the invention can depalletize various objects 13 of various dimensions and weight without significant changes to the settings. As a result, it is also possible to easily depalletize a pallet 12 on which layers consisting of various products of varying dimensions and weight are stacked without the device having to be adjusted for each layer of the respective product in order to prevent damage, for example. It is even possible to depalletize several rows of different objects in each layer, provided of course, that the objects can be stacked onto the pallet 12 in such a manner.

It has also to be understood that the control system or parts thereof can comprise software instructions to be executed on one or more microcomputers, microprocessors, microcontrollers or any other electronical programmable component or components. It is also possible to have one or more parts of the control system implemented in hardware such as e.g. electronic circuitry.

The invention claimed is:

1. A depalletizing device for removing an object from a pallet, the depalletizing device comprising:
   a carriage;
   a friction roller attached to the carriage, and rotatable about a horizontal rotation axis,
   a friction roller drive configured to rotate the friction roller,
   the carriage configured to be movable to and fro in a direction at right angles to the rotation axis of the friction roller and
   a carriage drive with variable driving power configured move the carriage and push the friction roller against a side of an object on the pallet in such a manner that the rotating friction roller exerts an upward friction force on the object, as a result of which the object is raised on that side,
   the carriage drive comprising a detection device and a control unit coupled to the detection device in order to control the driving power of the drive,
   the detection device configured to detect engagement of the rotating friction roller on the side of the object, and to detect that the object has been raised sufficiently high for the friction roller to pass underneath said object after the latter has been raised,
   the control unit configured so that, when the carriage is moved by the carriage drive in a direction at right angles to the rotation axis of the friction roller towards the side of the object, the driving power of the drive is controlled at a base value, and that,
       when it is detected by the detection device that the friction roller engages on the side of the object, the driving power of the carriage drive is increased from that base value thereby pushing the friction roller against the side of the object with greater force in order to increase the upward friction force on the object by the rotating friction roller, and that,
       the driving power of the carriage drive is immediately reduced when the detection device detects that the object has been raised sufficiently high for the friction roller to pass underneath said object after the latter has been raised.

2. The device according to claim 1, wherein the drive is designed to increase the power in a step by step manner.

3. The device according to claim 1, wherein the drive is designed to increase the power continuously.

4. The device according to claim 1, wherein the drive comprises an electrically driven motor.

5. The device according to claim 4, wherein the motor is a servomotor or frequency motor.

6. The device according to claim 1, wherein the detection device comprises optical detection.

7. The device according to claim 1, wherein the detection device comprise a light source and an optical sensor connected to the control unit which are arranged opposite one another in such a manner that a light beam is transmitted from the light source to the sensor at the front, parallel to the friction roller.

8. The device according to claim 1, wherein, behind the friction roller, a stationing platform is provided on the carriage for receiving objects which have been lifted up.

9. The device according to claim 1, wherein the device further comprises a conveying device provided on the carriage in order to transport the lifted object away from the friction roller towards the rear.

10. The device according to claim 1, further comprising a stationary guide along which the carriage can be moved to and fro in a horizontal direction.

11. The device according to claim 1, wherein the carriage is connected to a lifting member by means of which the vertical position of the carriage can be varied.

12. The device according to claim 1, wherein the drive comprises a transmission.

13. The device according to claim 12, wherein the transmission comprises a gear reduction.

14. The device according to claim 4, wherein the motor is fixedly connected and the carriage is coupled to the motor by a chain.

15. The device according to claim 1, wherein the friction roller is rigidly connected to the frame.

16. The device according to claim 1, wherein the drive is designed such that the carriage approaches the object to be lifted at a predetermined speed.

17. The device according to claim 1, wherein the drive of the carriage comprises a spherical robot.

18. A depalletizing method for removing an object from a pallet utilizing a depalletizing device comprising a carriage and a friction roller attached to the carriage, wherein the friction roller is rotated about a horizontal rotation axis by a friction roller drive which is coupled to the friction roller, the method comprising:
   moving the carriage, using a carriage drive with variable driving power, in a direction at right angles to the rotation axis towards a side of the objects while the driving power of the carriage drive is controlled at a base value;
   detecting, by a detection device, engagement of the rotating friction roller with the side of the object;
   increasing the driving power of the carriage drive from that base value when it is detected by the detection device that the friction roller engages on the side of the object, thereby pushing the friction roller against the side of the object with greater force in order to increase an upward friction force on the object by the rotating friction roller;
   detecting, by the detection device, that the object has been raised sufficiently high for the friction roller to pass underneath the object after the latter has been raised; and immediately reducing the driving power of the carriage drive after it has been detected by the detection device that the object has been raised sufficiently high for the friction roller to pass underneath the object after the latter has been raised.

19. The method of claim 18 wherein the drive comprises a control unit coupled to the detection device in order to control the power.

20. The method of claim 19 wherein the detection device comprises a light source and an optical sensor connected to the control unit which are arranged opposite one another in such a manner that a light beam is transmitted from the light source to the sensor at the front, parallel to the friction roller.

21. The method of claim 20 wherein the control unit is designed to increase the power of the motor for as long as a certain proportion of the light beam is interrupted by the object to be raised and to decrease the power when the light beam is no longer interrupted.

22. The device according to claim 7, wherein the control unit is designed to increase the power of the motor for as long as a certain proportion of the light beam is interrupted by the object to be raised and to decrease the power when the light beam is no longer interrupted.

* * * * *

UNITED STATES PATENT AND TRADEMARK OFFICE
CERTIFICATE OF CORRECTION

PATENT NO. : 8,342,791 B2
APPLICATION NO. : 13/190124
DATED : January 1, 2013
INVENTOR(S) : Mark Van De Klundert It is certified that error appears in the above-identified patent and that said Letters Patent is hereby corrected as shown below:

In the Claims:

In Claim 1, column 5, line 41, before the word "move" insert --to--

In Claim 18, column 6, line 55, replace "objects" with --object--

Signed and Sealed this
Twenty-sixth Day of March, 2013

Teresa Stanek Rea
*Acting Director of the United States Patent and Trademark Office*